US005816443A

United States Patent [19]

Bustos

[11] Patent Number: 5,816,443

[45] Date of Patent: Oct. 6, 1998

[54] PRODUCT VENDING SYSTEM WITH PNEUMATIC PRODUCT DELIVERY

[75] Inventor: Rafael T. Bustos, Alpharetta, Ga.

[73] Assignee: L&P Property Management Company, Chicago, Ill.

[21] Appl. No.: 571,252

[22] Filed: Dec. 12, 1995

Related U.S. Application Data

[63] Continuation-in-part of Ser. No. 449,935, May 25, 1995, Pat. No. 5,586,686, which is a continuation-in-part of Ser. No. 404,243, Mar. 15, 1995, abandoned.

[51] Int. Cl.[6] .......... B23Q 7/04

[52] U.S. Cl. .......... 221/211; 186/55

[58] Field of Search .......... 221/211, 278; 186/55, 53, 52; 406/3, 1, 2

[56] References Cited

U.S. PATENT DOCUMENTS

| | | | |
|---|---|---|---|
| 3,647,026 | 3/1972 | Alexander et al. | 186/1 C |
| 3,877,241 | 4/1975 | Wade | 62/137 |
| 3,951,461 | 4/1976 | De Feudis | 302/27 |
| 4,073,368 | 2/1978 | Mustapick | 186/1 C |
| 4,111,282 | 9/1978 | Vayda, Jr. | 186/1 C |
| 4,284,370 | 8/1981 | Danier et al. | 406/86 |
| 4,638,312 | 1/1987 | Quinn et al. | 340/825.35 |
| 4,675,515 | 6/1987 | Lucero | 235/381 |
| 4,712,650 | 12/1987 | Campbell | 186/41 |
| 5,105,979 | 4/1992 | Bakx et al. | 221/150 HC |
| 5,158,155 | 10/1992 | Domain et al. | 186/53 |
| 5,354,152 | 10/1994 | Reinhardt et al. | 406/3 |

FOREIGN PATENT DOCUMENTS

| | | |
|---|---|---|
| 509125 | 9/1930 | Germany . |
| 2514442 | 10/1976 | Germany . |
| 56-3229 | 1/1981 | Japan . |
| 2202694 | 8/1990 | Japan . |

*Primary Examiner*—Kenneth Noland
*Attorney, Agent, or Firm*—Wood, Herron & Evans, L.L.P.

[57] ABSTRACT

A system is provided for vending products such as beverage and other food products, preferably individually packaged, from a storage unit to a customer terminal at a remote location through a pneumatic tube conveyor to move the product from storage to a dispensing unit at the remote location in response to product selection made by a customer at the remote location. Preferably, a vending system is provided for marketing products to customers of a facility at which they are engaged in a transaction for the purchase of another product or service of a diverse vending system. In such an embodiment, payment for the purchase price of the product is accounted for through the payment subsystem that accounts for the transaction with the diverse vending system. For example, an ancillary system may sell food, beverages or vehicle care products to gasoline customers by charging to a gasoline charge system having a credit card reader associated with a self-service gasoline pump to process the gasoline purchase charge. A hotel guest's room account may be charged for items purchased on a terminal in the guest's room, or elsewhere by reading the guest's key card. Terminals at retail checkout lanes may automatically charge to a cash register transaction being processed. The product is preferably moved through the conveyor in a reusable carrier or in its own product packaging container that serves as a carrier.

35 Claims, 6 Drawing Sheets

PRODUCT VENDING SYSTEM WITH PNEUMATIC PRODUCT DELIVERY

This is a continuation-in-part of U.S. patent application Ser. No. 08/449,935, filed May 25, 1995, now U.S. Pat. No. 5,586,686, entitled "Temperature Maintained Food Dispensing System and Method", which is a continuation-in-part of U.S. patent application Ser. No. 08/404,243, filed Mar. 15, 1995, now abandoned, entitled "Temperature Maintained Beverage Dispensing System And Method", both of which are hereby expressly incorporated by reference herein.

FIELD OF INVENTION

This invention relates to the vending, delivery and dispensing of individually packaged products such as beverages or other items of food, and, more particularly, to the delivery and dispensing of food and other vended products, and to the accounting for payment for such vended products.

BACKGROUND OF THE INVENTION

Much of the merchandising of food and beverages and the vending of a large number of other retail products occurs in circumstances that are ancillary to some other marketing activity by which other products and services are sold. That other activity is the primary attraction that brings the customer onto the business premises of the merchant or causes the customer to enter into a business relationship with the merchant. For example, hotel and travel accommodations, entertainment and sports events, recreational activities, and routine service activities such as tending to automobile fueling and service, personal grooming services and waiting for services or business appointments all may provide the primary reasons for people to enter onto certain business premises or to engage in a communication with a business enterprise. Such customers then purchase goods or services which result in charges or other forms of payment being made for such services or products.

On the occasions of the presence on such business premises, such people often have a demand for other products, such as food or beverage products, and become potential customers of the merchandising of such other products. The demands for such other products in such circumstances are not the result of any particular purchasing effort made by such customers to obtain such products, but are rather demands arising out of inherent needs ancillary to the occasions that attracted the people to the business premises. Accordingly, the success of the merchandising of products to such potential customers is largely based on the merchant having in place a system to take advantage of the opportunity to serve the customers' needs. The ability to provide the needed products to the customer with maximum convenience while avoiding extra effort and time commitments by the customer may be the key to the success of any additional sales activity by the merchant. On such occasions, the success in vending such ancillary products may be based more on the convenience and ease of the transaction to the customer than on the price. However, the practicality of providing such systems by the merchant may also be based on the convenience to the merchant in servicing such system without employing additional personnel or space consuming facilities to display or deliver the products or to register payment for the additional goods provided.

In prior art merchandising systems, the vending of food and other ancillary products to persons attending some event or being on business premises for some primary reason other than the purchase of such ancillary products has required a generally labor intensive and space consuming enterprise that often requires substantially different skills and expertise than the main business being conducted on the site. Engaging in the vending of such products can add substantially to the overall business effort and cost of the business, which is often impractical and not worthwhile to the merchant. The activity of vending some unrelated products to a business's customers requires a commitment by the business, which, in many cases, deters the business from engaging in the vending opportunity.

Customers of many businesses have idle time during which they could purchase merchandise and would purchase merchandise but for the reason that there is no opportunity to do so. For example, when fueling an automobile at a self-service gasoline pump island of a gasoline service station, several minutes are spend waiting for the tank to fill. During this time, the purchase of a soft drink or other product could be made by the gasoline customer who cannot conveniently leave the pump location while the vehicle is being fueled to enter the service building or to approach a vending machine. Such a gasoline customer may be provided with a card reader at the pump, which accepts a charge card account as payment for the fuel without the need to enter the station. Such a customer may therefore forego the expenditure of the additional time required to leave the fueled vehicle at the pump to purchase food, a beverage, or another marginally necessary product. Other customers spend time waiting for professional services, for service to be performed on vehicles, for appointments in barbershops and beauty salons, in ticket and admission lines and at a variety of other business locations. During this idle time, the opportunities to vend products to these customers is lost due to the difficulty and cost of providing or adapting a merchandising system to the occasions.

Difficulty in merchandising products to customers is due in part to the need to protectively store products for sale, particularly where the product is a beverage or other food product. For example, the retail sale of beverages for immediate consumption is typically carried out in one of two ways: either by over-the-counter sale by a server or attendant at a store or other indoor location or by mechanized unattended sale from a drink dispensing machine, which may be at an indoor or an outdoor location. Beverages that are to be sold for immediate consumption are usually stored at a refrigerated temperature that is several degrees above the freezing point of water. The refrigeration is most commonly achieved by cooling a storage enclosure within the store building that is otherwise maintained at a typical room temperature. In addition, in geographic locations where temperatures drop below freezing, some heating of the building that surrounds the beverage storage enclosure maintains the building at the room temperature. With outdoor dispensing machines, such machines are usually not employed at times where below freezing temperatures are expected.

Systems have been provided for the marketing of beverages such as juices and soft drinks at locations more convenient to consumers. Such locations have included many that are frequented by vehicular or pedestrian traffic, such as gas stations and entertainment facilities. These locations have included concession counters and convenience stores that have been integrated with the gas station or entertainment facility.

Outdoor retail locations such as the vehicle service islands of gas stations are increasingly being provided with payment devices such as credit card readers that are operatively connected with the vehicle service devices, such as the gasoline dispensing pumps, for use by a customer purchasing gasoline, for example, to pay for the purchase without leaving the vicinity of the vehicle. At such locations, the customer is, nonetheless, required to enter the adjacent store facility to purchase snacks or beverages. The logistics of purchasing such additional products subjects the customer to an additional inconvenience, requiring some additional time and effort, which, in a certain percentage of cases, the consumer elects to forego, resulting in a loss to the retailer of a potential sale. Furthermore, the use of card readers at self-service gasoline pumps provides the capability for completely unattended gasoline sales, with the customer delivering the purchased gasoline from the self-service pump and making automatic payment without the intervention of a service attendant. Such a capability makes possible the sale of gasoline at night or at other times when no attendant is on duty, since there is no cash that must be handled and no requirement for the added security incident to a facility at which cash will be accepted and stored. At such unattended facilities, conventional systems for providing additional products such as beverages to the gasoline customer are not readily adaptable.

The vending of sandwiches and other solid food products for immediate consumption in the facilities discussed above present similar problems. Such products must usually be contained in their individual packaging, must be protected from environmental conditions such as excess heat or cold, and are preferably cooled or heated prior to or upon vending so as to require a freezer or a heating device such as a broiler or microwave oven that is preferable not to maintain at the vending area. With carry-out and drive-through fast food facilities, prepared heated or cooled foods are selected by customers from limited lists, packaged, paid for, and delivered into the hands of the customer in a manual labor intensive operation, presenting similar problems.

Accordingly, there is a need in the retailing industry, particularly for the sale of cool beverages, or temperature maintained, cooled or heated food items at locations such as gas stations, for delivering and dispensing such products to the consumer at a location of maximum convenience.

SUMMARY OF THE INVENTION

A primary objective of the present invention is to provide a method and system for merchandising products to customers in situations and at locations where it has previously been inconvenient or expensive to do so. It is a particular objective of the present invention to vend food and other products to customers at locations at which it may be impractical to store the products and to do so in a way that minimizes the amount of human labor required to sell and deliver the products to the customer.

It is one particular objective of the present invention to provide a vending system with the ability to automatically deliver and dispense or otherwise present products to customers at locations remote from the product storage area and to allow the customer the ability to select products and order their purchases without the intervention or assistance of a sales or product delivery person. It is a more particular objective of the present invention to provide such a system in which products can be stored at a convenient storage location and automatically dispensed to a customer at a location sufficiently remote from the storage location to separate the supply from the vending site and to accommodate a pedestrian, article or vehicle passage or a structure, device or partition therebetween.

It is another particular objective of the present invention to provide a vending system with the ability to automatically convey products in their own packages to customers without the need for the product to be carried to the customer by a delivery person or by the movement of a reusable mechanical carrier as part of the delivery system. A further objective of the present invention is to provide a system and method for delivering purchased products to customers, and particularly for delivering and dispensing temperature maintained beverages or other food products in their own non-reusable individual packages or packaging containers to consumers at non-temperature controlled locations that are of greater convenience to the customers than would be the temperature controlled locations at which the products are stored.

It is a further objective of the present invention to provide a potentially unattended system and method for delivering a temperature maintained beverage or other product to a consumer at a non-temperature controlled location, particularly by maintaining the product at a location that is remote from the dispensing location and is secure. It is a further objective of the present invention to provide such a system and method by which completely unattended consumer sales of products such as beverages and other food products for immediate consumption may be carried out.

Another objective of the present invention is to provide an auxiliary product vending system that supplements a diverse product or service providing system, particularly a diverse system that includes or is associated with a payment receiving or charging subsystem, and which can service the customers of such a diverse system and use the payment subsystem of the diverse system to account for payment for the products sold through the auxiliary product vending system.

According to the principles of the present invention, a method and system are provided by which individually packaged products, including beverages, such as soft drinks, solid food items such as sandwiches and ice cream, and other consumable convenience products, are maintained, preferably in a temperature controlled environment if beneficial, at a storage location that is remote from a point of sale to a consumer desiring such product for immediate consumption. With the preferred embodiment of the invention, the product is ordered and may also be paid for by the consumer at the point of sale adjacent a service counter, an outdoor access lane, which may be at a drive-up location such as at a vehicle accessible gasoline pump island at a gasoline service station, or at some other goods and services vending area, such as a general store counter, a ticket counter, an exercise machine, or other such location. The ordered product is delivered, in response to the order, from the storage location by way of a pneumatic tube.

In accordance with one preferred embodiment of the invention, a mechanism is provided that selects a product in response to the entry of a selection command by the consumer at the point of sale, and feeds the product in its packaging container, either by loading the packaging container into an adequately insulated and padded capsule or carrier, for delivery through the pneumatic tube, or preferably by loading the packaging container directly into the pneumatic tube, with the container appropriately configured to fit in and through the tube. A pneumatic tube conveyor system delivers the product to the point of sale at which the product may be carefully decelerated and automatically removed from the capsule, or presented only in its packaging container, to the consumer. More than one customer terminal may be provided in a single system, in which case any of a number of conventional techniques may be used to route the product to the customer terminal from which the order originated, and to charge the price of the product to the appropriate customer.

In certain preferred forms of the invention, the system of the present invention is provided in the form of a supplemental or auxiliary product vending system by which advantage is taken of the access to the customers of a diverse product vending or service providing system. Preferably, advantage is also taken of the components of the diverse system or the subsystems with which it is associated, particularly of the payment accounting subsystem of the diverse system. For example, accounting for payment for an order placed by a customer in the auxiliary system may be carried out by way of coded information identifying the user account and entered at the point of sale, such as by charging or otherwise posting the payment to an account of the customer. In a gasoline vending system, for example, the vending of automobile maintenance items, food or other products may be made to gasoline system customers and with the charge therefor made to a gasoline charge account that is identified by reading a gasoline credit card of the user in connection with the purchase of gasoline or other such product.

Further, in other diverse systems, a charge may be made to the membership account of a user or customer of the system for products purchased through an auxiliary system according to the present invention by accepting and reading a membership card, key card or user entered personal identification number or code, at a membership facility such as a recreational or social club, athletic or other such facility. In addition, in a diverse system such as a hotel, a hotel guest may select items from a menu via the room television set and have purchases of products delivered by tube to the room and charged to a guest room. Such a guest may also purchase items outside of the hotel room on the hotel premises, by inserting a room key or key card and ordering a product by way of the video or other automated equipment. Thus, a hotel guest may purchase, for example, a beverage, a snack or a personal article in a hotel hall or lobby, at pool side or in an exercise room. The hotel may use such a system to replace much of the room service and the provision and stocking of a hotel room minibar. Similarly, in restaurants, airports, supermarkets, and other facilities where a patron thereof is identified personally or through an account such that the patrons funds will be applied or charged for the products or services provided by the diverse system, auxiliary systems according to the present invention may utilize the charging or payment receiving capacity of the diverse system.

Features of the present invention are also useful in food vending systems such as hotel room-service systems, remote bar service and fast food carry-out and drive-through facilities and to provide refreshments in stadiums, arenas and theaters. In such facilities or systems, automated order accepting terminals located remote from a bar or kitchen may communicate an order to a central location at which prepared food items, may be either prepackaged or manually prepared and placed in special carrier shaped non-reusable containers. The containers may form the packaging container for the food product or may surround such a packaging container, and thus form a disposable carrier for the packaging container. The non-reusable container is then loaded, either manually or automatically, into the tube of a pneumatic conveyor to be pneumatically transferred to a dispensing terminal at the remote terminal. Such terminals may be provided with automated payment devices, or preferably, with card readers or other customer or customer account identifying devices. Such devices may further be coupled with a diverse product or service vending system.

In certain embodiments of the invention, the pneumatic tube transports the product from a storage location to one or more terminals that are remote from the storage location, particularly across a pedestrian or vehicle lane or way, or past a product conveyor or other transport lane or other object that prevents placing the product storage at the point of sale or delivery of the product to the customer, or through a wall or floor or past another object that separates the customer from the storage area.

Further in accordance with certain embodiments of the present invention, there is provision for automation of the product storage restocking process. The product storage is preferably made accessible to the product supplier or distributor, for example, by providing a beverage storage unit at a gasoline service station accessible from outside of the building through a locked door to which a product supplier's delivery person has a key. Such storage unit can be restocked at any time, not only when the gasoline station attendant is on duty. Communication with the product distributor is made automatically by the system, which keeps track of inventory and automatically signals the distributor or supplier when stocks are low.

The advantages of the present invention include that of convenience to the consumer. In addition, the method and system of the present invention facilitate the sale of beverages and other such consumable products where sales might not otherwise take place. Such sales may also take place without an attendant being on duty to provide the product or to collect the payment for the product, because the credit charging capacity of the gas dispensing or other such operation can be utilized. Further, such product sales will command a higher price due to the additional convenience that is provided. As a result, the profitability of operating a retail facility such as a gas station is likely to be increased. With the system of the present invention, the products dispensed are protected from heat and cold, and the exchange of cash in connection with such a product's sale is avoided, thus eliminating one element of the problem of the security of the facility.

These and other objectives and advantages of the present invention will be more readily apparent from the following detailed description of the drawings of the preferred embodiment of the invention, in which:

DETAILED DESCRIPTION OF THE DRAWINGS

Figures 1, 1A, 1B:
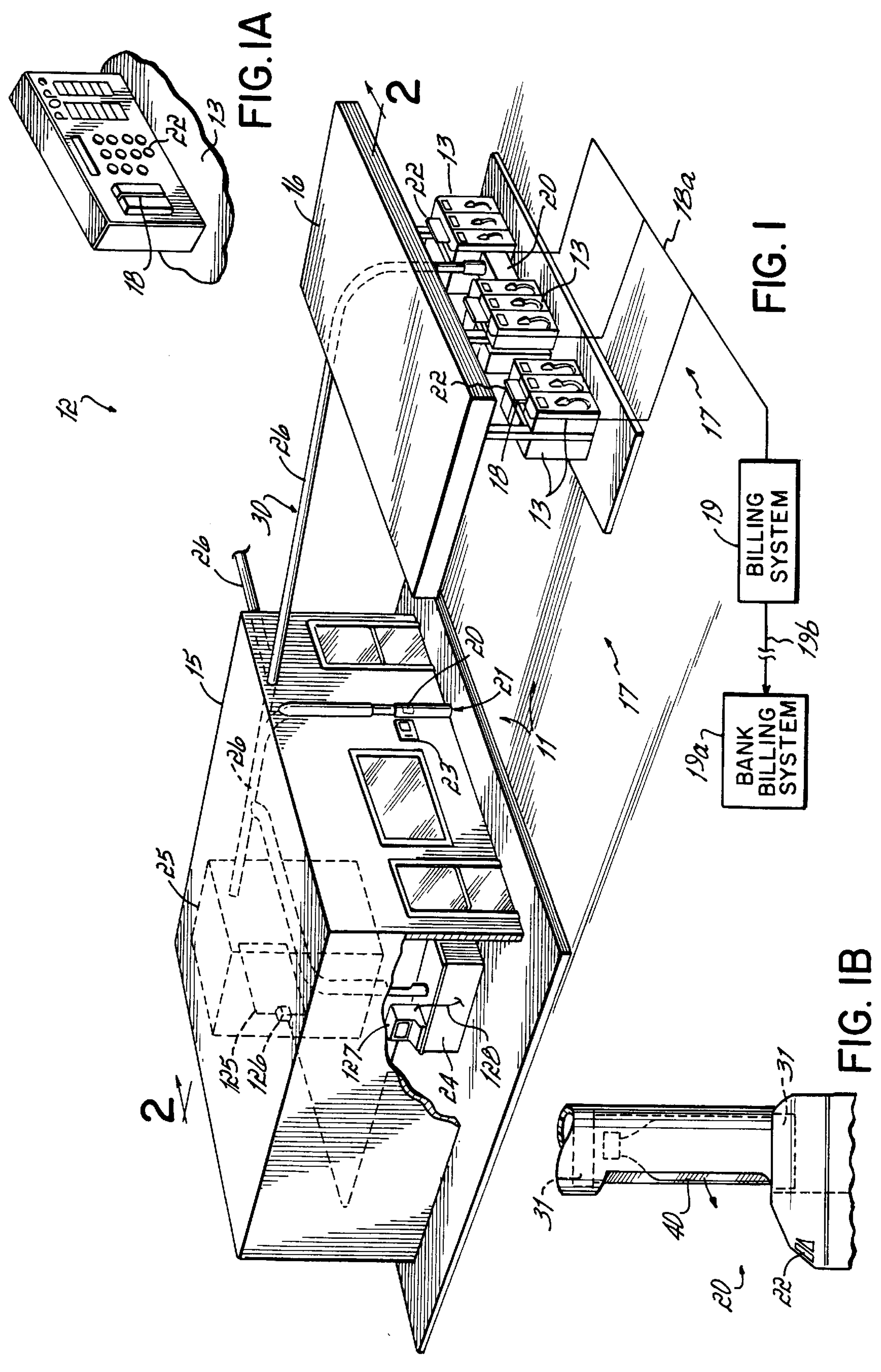
FIG. 1 is a perspective view of one preferred embodiment of a system according to principles of the present invention.
FIG. 1A is a schematic perspective view of a card reader of the system in one alternative embodiment to that of FIG. 1.
FIG. 1B is a schematic perspective view of an alternative dispensing unit of the system of FIG. 1.

FIG. 1 illustrates one preferred embodiment of the invention in the form of an automated retail system 10 that includes a product vending system in the form of an automated food or beverage delivery and dispensing system 11 in combination with a diverse product providing system in the form of a self-service gasoline dispensing facility 12. The gasoline dispensing system 12 of the combination 10 typically includes a building 15 that may be an attended retail store with one or more remote outdoor gasoline pumps 13 located at one or more remote outdoor islands 16 that are accessible to the customers of the gasoline facility 11. Adjacent the store building 15 and the island 16 are provided one or more vehicle lanes 17 that render the building 15 and the pump island 16 directly accessible to the vehicles of customers. In all but ideal climates, the building 15 is usually provided with climate control such as heating and air-conditioning, while the pump island, being outdoors, is at the ambient temperature dictated by the climate.

Pump islands 16 are increasingly being provided, even in the prior art systems, with card readers 18 that are electrically interconnected with an accounting, payment or billing system 19 of the facility 12, which is typically in communication with an on-line credit card verification or banking operation 19*a,* often by way of telephone lines, 19*b*. With such billing systems, gasoline customers of the facility 12 are able to purchase gasoline without the assistance of an attendant, either to pump the gasoline or to collect the payment therefor, and can do so without leaving the vicinity of their vehicles in the lanes 17. Such billing systems 19 are provided with logic that combines information from the gas pumps 13 relating to the amount and type of gasoline purchased with account information relating to the customer from the card reader 18. The billing system 19, in one form, is an on-line terminal of a large computer at a central bank or oil company credit card account system or a combination of a cash register and such a terminal. In another form, the system 19 includes a programmed computer at the facility 12, which may process all charges on the site or be combined with the terminal form of system and shares functions with the computer at the central accounting system.

With the present invention, the addition of the product dispensing and delivery system 11 as an auxiliary system to a diverse product or service providing system, such as the self-service gasoline vending facility 12, provides the capability for the gasoline customer of the facility 12 to also purchase beverages and other products with the same convenience as is possible for the purchase of gasoline, and at the same time. This is provided by including in the system 11 one or more customer accessible product delivery terminals that include product presenting or dispensing units, such as beverage dispensing units 20, adjacent the gas pumps 13 at each of a plurality of the gasoline pump islands 16 or at another outdoor location 21 adjacent the traffic lanes 17. The dispensing units 20 of the customer terminals are preferably each adjacent to or included in the credit card reader 18, and provided with an order entry panel 22 by which the customer may add to his gasoline purchase the selection and purchase of a beverage, as illustrated in FIG. 1A. The panels 22 preferably include one or more selectors, such as push buttons (not shown) for selecting the product to be purchased.

The units 20 are preferably connected to some device, circuitry or other transmission or communication link 18a that is in communication with the card reader 18 or the billing system 19 of the gasoline vending system 12 so that information of the purchase and price of the product is communicated to a payment system such as the gasoline credit card account of the customer. A separate card reader 23, customer identifier or payment device may be provided at any of the dispensing units 20, for example, at a location 21 that is distant from the reader 18 at the pump island 16. Such dispensing units 20 preferably include a panel 22, so that the consumer may order such a beverage, as illustrated in FIG. 1. Also, a dispensing unit 20 may be provided at an attended counter or indoor room temperature location 24, and tied into a payment device, which may be in the form of a credit card reader, a personal identification number entry device, or a cash register payment receiving or charge system within the building 15, which is set to process a transaction of the customer of the vending system 11.

In its preferred form, the payment device by which the price of the product being vended is charged to a particular customer is in the form of a communication device or circuit that is tied into a diverse system through which a customer has initiated a transaction, having entered the information necessary to charge the customer with the price of the product or to include the price in the product in the amount of the pending transaction. Thus, by situating the payment device at a gasoline pump at which credit card information is entered to activate a gasoline dispensing transaction, the customer, who generally occupies the space adjacent the order entry device 22 on which an order for the product is made, can merely enter a purchase selection on the panel 22, without further entry of customer identifying or account information. Similarly, by situating the customer terminal adjacent a checkout lane of a supermarket, convenience store or other retail facility so that only a customer in the process of engaging in a retail transaction has access to the panel 22, a product order can be processed from a selection on the panel 22, charging the price directly to the pending transaction being processed at the checkout lane cash register.

In the illustrated embodiment of FIG. 1, the beverage vending system 11 is further provided with a temperature controlled storage vault 25 that is preferably enclosed within the store facility 15 and is generally refrigerated or preferably enclosed within the store facility 15 and is generally refrigerated or otherwise temperature maintained at approximately 5° C. The vault 25 is interconnected with each of the dispensing units 20 by one of the pneumatic tubes 26 of a pneumatic delivery system 30 of a type more particularly illustrated in FIG. 2.

Figure 2:
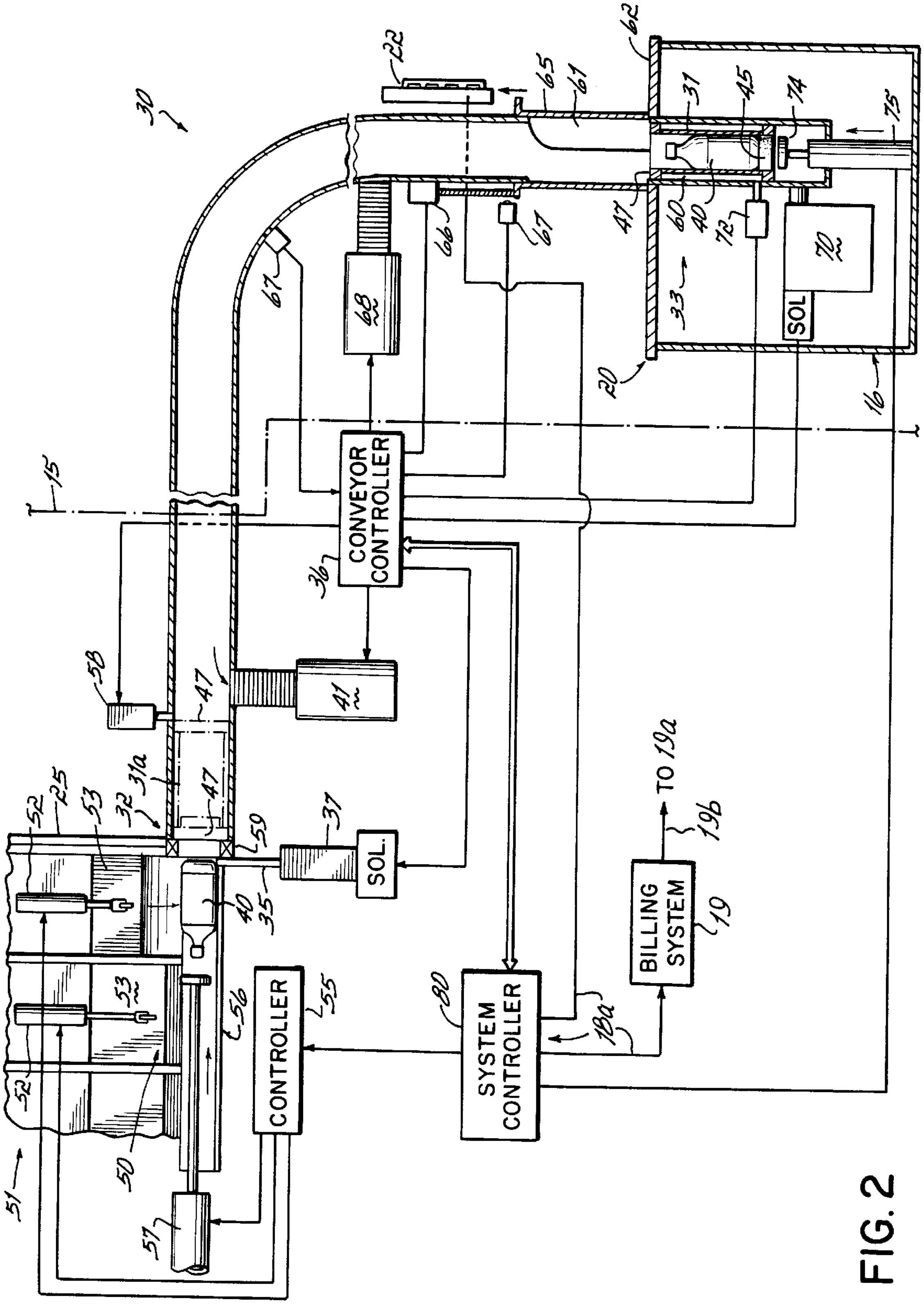
FIG. 2 is a cross-sectional view of the system of FIG. 1 along the line 2—2 of FIG. 1, illustrating, in one portion thereof, a carrier or capsule being loaded with product and, in another portion thereof, a capsule that has been delivered to the point of sale.

Referring to FIG. 2, the pneumatic delivery system 30 includes the tube 26 of generally circular cross-section, which extends from the vault or beverage storage unit 25 within the store building 15, and the beverage dispensing unit 20 at the gas pump island 16. According to one embodiment of the invention, within the tube 26 is contained a carrier 31, which, during normal operation of the pneumatic delivery system 30, is not removable from the tube 26, although the carrier 31 may be removed from the tube 26 by way of a service door (not shown) in the tube 26 at one or more locations along the tube 26. The tube 26 has a single loading end 32 at the vault 25 and a single discharge end 33 at the dispensing unit 20, with only one carrier 31 per tube 26, although more than one such tube 26 may be provided to connect the vault 25 with more than one dispensing unit 20 at different outdoor or other locations.

The storage unit 25 may be provided with a reloading access door 125 that is accessible from outside of the building 15 to permit restocking by the product distributor without involvement of the operators of the gas station facility 12. Such a storage unit 25 is preferably provided with sensors 126 that may be linked to the inputs of a computer 127 that is programmed to automatically evaluate the stock in the unit 25 and communicate over phone lines 128 with the product distributor, advising that the storage unit 25 at the particular facility 12 is in need of being restocked.

At the loading end 32 of the tube 26, a pneumatically or electrically operable gate 35 is provided, which is operated in response to a signal from a pneumatic delivery system or conveyor controller 36 to a gate actuator unit 37. The gate 35 is moveable between an open position at which a filled beverage container 40 may be loaded from the vault 25 into the carrier 31 and a closed position that will allow a vacuum to be drawn between the gate 35 and the carrier 31 to move an empty carrier 31 from the dispensing unit 20 toward the vault 25. Such a vacuum is applied by a high volume pump 41 being operated at a vacuum. The actuator unit 37 may also be provided with valving, a pump or other devices to vent or otherwise control the pressure within the tube 26 immediately inside of the gate 35 to insure the desired motion of the carrier 31 in the portion of the tube between the gate 35 and the pump 41.

Figure 3A:
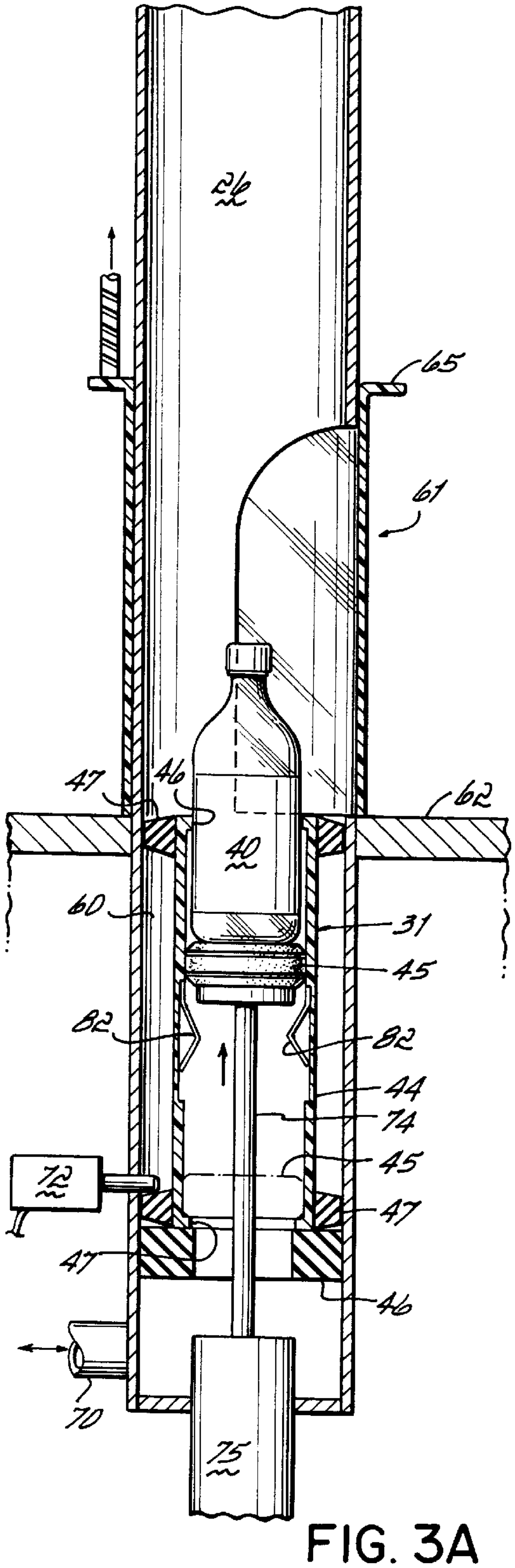
FIG. 3A is a cross-sectional view illustrating a portion of FIG. 2 with the capsule in an intermediate stage of being unloaded of product.
Figure 3B:
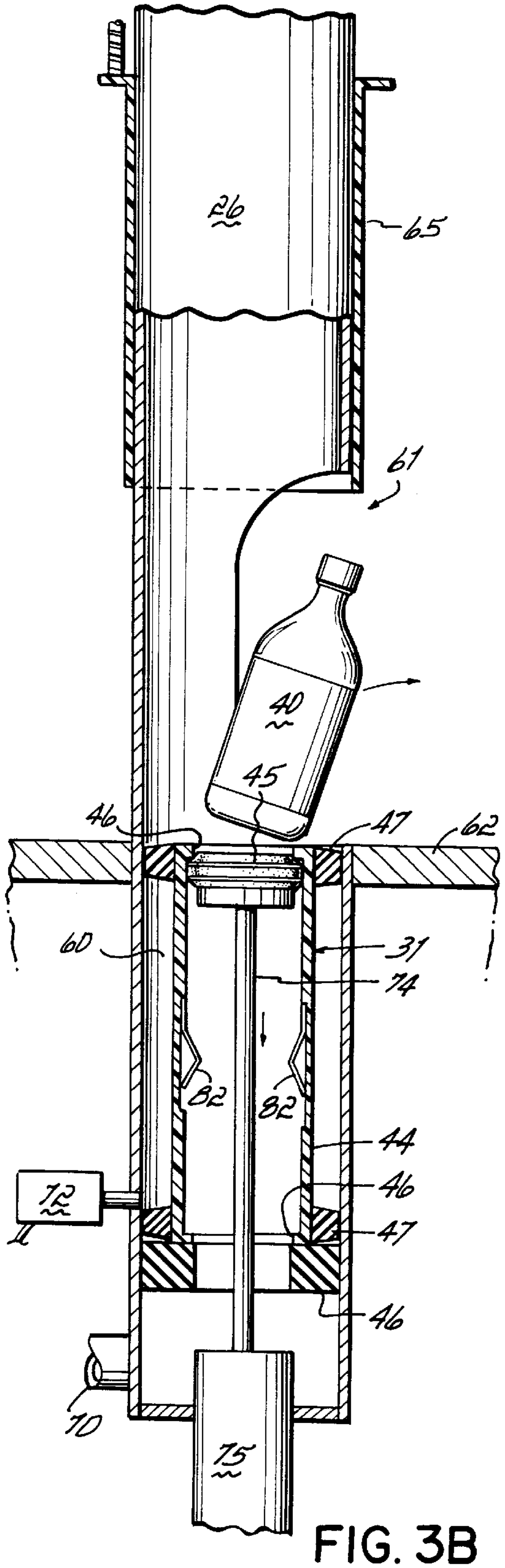
FIG. 3B is a cross-sectional view similar to FIG. 3A with the capsule in a final stage of being unloaded of product.

The configuration of the carrier 31, which is illustrated in more detail in FIGS. 3A and 3B, may be formed of a cylindrical tubular body 44 formed of metal or hard plastic, which is open at both ends. The inside surface of the body 44 is formed of a padded and thermally insulative material 43. Within the body 44 is slidably mounted a circular plunger 45. The inner surface of the insulative material 43 is formed of a material that is adapted to permit the plunger 45 to slide fairly freely but to form at least a moderate air seal with the body 44. The plunger 45 is contained within the body by circular stops 46 formed in the opposite ends of the body 44. The plunger 45 slides sufficiently freely in the body 44 so as to be drawn to the low pressure side of the carrier 31 and thus locate itself at the leading end of the carrier 31 as the carrier 31 is being pneumatically forced through the tube 26. At the ends of the body 44, around the outside of the stops 46, is provided a pair of annular bumpers 47, preferably of a moderately hard rubber or similarly elastic synthetic material. The bumpers 47 support the carrier 31 in a low friction slidable contact with the wall of the tube 26 and hold the body 44 in spaced relationship to the wall of the tube 26 to facilitate the movement of the carrier 31 around curves and bends in the tube 26. The plunger 45 provides both a seal to facilitate movement of the carrier 31 in the tube 26 and a support for the bottom of the container 40 in the carrier 31. The inside surface of the body 44 provides a small amount of friction force to hold a container 40 therein while the carrier 31 is moving, but not so much friction as to interfere with the loading of the container 40 into the carrier 31. In addition or in the alternative, other elements may be provided to hold the product container 40 in the carrier 31, such as pins or, as illustrated in FIGS. 3A and 3B, for example, by spring clips 82.

Referring again to FIG. 2, within the vault 25 is provided a conveyor loading mechanism 50 for feeding beverage containers 40 of any selected one of a number of types from a supply 51 to the input end 32 of the tube 26. Any one of a number of retrieving and feeding devices may be provided as the mechanism 50 to drop or robotically retrieve and place the selected container 50 into the open end 32 of the tube 26. In FIG. 2, a drop-shoot vending machine type of dispensing unit is illustrated as the mechanism 50 for simplicity, in which actuators 52 open a door 53 at the bottom of the supply 51 to individually drop one beverage container 40, in accordance with a signal from a loading mechanism controller 55, onto a loading trough 56, with the bottom of the container 40 facing the open end 32 of the tube 26. In this position, a loading ram 57 pushes the container 40 into the carrier 31, also in response to a signal from the controller 55.

To be loaded with a container of beverage 40, the carrier 31 must be secured in the position illustrated by the phantom lines 31*a* in FIG. 2. In this position, one of the bumpers 47 will rest against a fixed bumper or stop 59 surrounding the opening at the open end 32 of the tube 26, and are of smaller diameter than the tube 26 or the bumpers 47 of the carrier 31 to trap the carrier 31 in the tube 26. In this position, a solenoid actuated locking member 56, which is activated by a signal from the conveyor controller 36, holds the carrier 31 immobile while the container 40 is being loaded into the carrier 31. During loading, of course the gate 35 is open. Also during loading, the plunger 45 may be in any position initially, but it will be forced to the end of the carrier 31 that is farthest from the end 32 of the tube 26 by the pushing of the container 40 by the ram 57. The carrier 31, with the slidable plunger is symmetrical and, with some tube configurations, can be used in either direction and loaded with containers 40 from either side.

The tube 26 usually extends horizontally from the vault 25 but may rise or fall somewhat on the way to the location of the dispensing unit 20. Approaching the dispensing unit 20, the tube 26, in the preferred embodiment, changes to a vertical orientation to enter the dispensing unit 20 from the bottom or, as shown in the illustrated embodiment, from the top. The discharge end of the tube 26 at the dispensing unit 20 is preferably closed and contains a carrier holding space 60, approximately as long as the carrier 31, that spaces the closed end 33 of the tube 26 from a delivery window 61 in the side of the tube 26. A horizontal surface 62 in the form of a counter top covers the dispensing unit 20 and aligns with the boundary between the top of the holding space 60 and the delivery window 61. The delivery window 61 faces the customer, for example, toward the window of a vehicle 64 on the access way 17, and is provided with a door or cover 65 that, when in a closed position, pneumatically seals the window 61, as in FIG. 3A, and when in an open position allows a container 40 to be removed from the tube 26, as in FIG. 3B. The door or cover 65 may be configured to open and close by vertical movement on the tube 26, or by rotational movement around the tube 26, or by hinged motion or otherwise. Preferably, the opening and closing of the door is achieved by the actuation of a door operating motor 66 in response to a signal from the conveyor controller 36. The door 65 may be made of a transparent plastic material, which is particularly desirable if manual opening of the door 65 or manual activation of the door opening actuator 66 is desired.

In the vertical portion of the tube 26, either near the end 33 of the tube 26 or, preferably, just above the delivery window 61, is an additional high volume pump 68, which is also controlled by signals from the conveyor controller 36.

The pump 68 operates in cooperation with the pump 41 to move the carrier 31 back and forth between the vault 25 and the dispensing unit 20. This pump 68 may be a vacuum pump or may also be capable of operation at positive pressure. When a carrier 31 is being moved from the vault 25 toward the dispensing unit 20, the pump 68 will operate at a vacuum, at least until the carrier 31 is in a position and moving at a speed sufficient to insure that it will continue to drop by gravity toward the dispensing unit 20. The position and speed of the carrier 31 may be verified by the provision of one or more sensors, such as, for example, optical sensor 67 in the wall of the tube 26. When the carrier 31 has reached the point of the sensor 67, for example, the pump 68 and/or a pressure control unit 70, which may include one or more valves, vents to atmosphere or pumps, will be operated to insure that some pressure is provided in a sealed space in the tube 26 below the arriving carrier 31 to cushion the arrival of the carrier 31 at the dispensing unit 20, and to bring it to rest gently in the space 60 adjacent the end 33 of the tube 26.

When a carrier 31 has arrived at the space 60 containing a beverage container 40, a locking solenoid 72 is actuated in response to a signal from the conveyor controller 36 to lock the carrier 31 in position in the tube 26 so that the beverage container 40 therein can be unloaded. The unloading of the beverage container 40 is accomplished by the movement of a piston 74 of an unloading cylinder 75 that is actuated, also in response to a signal from the conveyor controller 36, as is better illustrated in FIGS. 3A and 3B. As illustrated in FIG. 3A, the actuation of the cylinder 75 extends the piston 74 upwardly into contact with the underside of the plunger 45. With the locking solenoid 72 holding the carrier 31 against movement in the space 60, the plunger 45 slides upwardly in the carrier 31, lifting the container 40 upwardly into alignment with the window 61 above the counter surface 62. When the container 40 is adjacent the window 61 with the plunger 45 aligned with the countertop 62, the door opening mechanism 66 is actuated to open the door 65 so that the container 40 can be removed by the customer, as illustrated in FIG. 3B.

An alternative structure for the pneumatic delivery system 30 may provide for the carrier 31 to have a door or opening in the tubular body 44 for the removal of the contents by the customer, as the carrier 31 presents the product at the dispensing unit 20, as illustrated in FIG. 1B. Pneumatic delivery systems that include additional details of systems such as system 30 are well known and may be utilized with the system 30 described herein.

The operation of the conveyor controller 36 and the loading mechanism controller 55 are coordinated and controlled in response to orders placed by customers on the panel 22 and in response to payments made by way of entry of charge account information into the card reader 18, through a beverage delivery system or main controller 80. For example, when a gasoline customer purchases gasoline and inserts a charge card in the card reader 18, a message is displayed asking if an additional purchase of a beverage is desired. If so, an order may be placed by selecting the brand and type of beverage desired by pressing a button on the panel 22. This button selection transmits the beverage order to the main controller 80 which preferably controls the conveyor controller 36 and loading mechanism controller 55 to cause delivery of the product to the customer. The controller 80 is also part of the communication circuitry 18*a* that causes the price of the order to be added to the gasoline charge made through the billing system 19 (FIG. 1) to the account identified by the card read by the card reader 18. If the carrier 31 is in the position 31*a* indicated by the phantom lines near the loading end 32 of the tube 26 in FIG. 2, the gate 35 is opened, the loading mechanism controller 55 is signaled by the controller 80, which causes the controller 55 to activate the appropriate actuator 52 to open the door 53 to drop the selected beverage in its container 40 into the trough 56. Thereupon, the controller 55 energizes the cylinder 57 to push the dropped container 40 from the trough 56 into the carrier 40. When the controller 80 determines that the container 40 has been loaded into the carrier 31, through feedback signals from the controller 55 or through additional sensors (not shown) that may be provided, the conveyor controller 36 is signaled to initiate the transporting of the loaded carrier 31 to the dispensing station 20.

The transporting of the carrier 31 to the dispensing station or unit 20 begins with the assurance that the door 65 that covers the window 61 is closed and that the pressure control unit 70 is set to insure that the lower end of the tube 26 is sealed. Then the pump 68 is energized. The gate 35 will remain open at this time or there will be other openings to allow a venting of atmosphere to the vault side of the carrier 31. This will cause the carrier to be drawn through the tube 26 toward the pump 68. When the carrier 31 has reached the vicinity of the sensor 67 and is moving sufficiently to cause it to reach the vertical section of the tube 26, the pump 68 is turned off, allowing the carrier 31 to free fall. However, in that the lower portion of the tube 26 is sealed, pressure in the tube 26 below the carrier 31 will inhibit the fall of the carrier 31. Either by providing for appropriate sealing in the lower end of the tube 26 to allow for a controlled escape of air from the tube 26, or by operating the pressure control unit 70, which is optional, pressure can be maintained in the lower portion of the tube 26 that allows the carrier to be gently lowered to the space 60 at the lower end of the tube 26 so as to rest on a stop 81 provided there, at which point it is locked by the actuation of the lock solenoid 72 in response to a signal from the conveyor controller 36.

Then, the piston 74 is actuated to lift the container 40 on the plunger 45 to the window 61, the door 65 covering the window 61 is opened, and the beverage container 40 is removed. Thereupon, the door 65 is closed, the gate 35 at the upper end of the tube 26 is closed, the pressure control 70 is actuated to vent the lower end 33 of the tube 26 to atmosphere, and the motor 41 is operated to apply a vacuum to the tube 26. The vacuum in the tube 26 first draws the plunger 45 to the top of the carrier 31 where it rests against the stop 47. Then, the pressure differential on the plunger 45 causes the carrier 31 to be forced upwardly in the tube 26 toward the pump 41. Pump 41 is turned off as the carrier 31 approaches, allowing the carrier to continue toward the stop 59 at the end 32 of the tube 26. At this position, the carrier 31 may be stored to await another order.

Figure 4A:
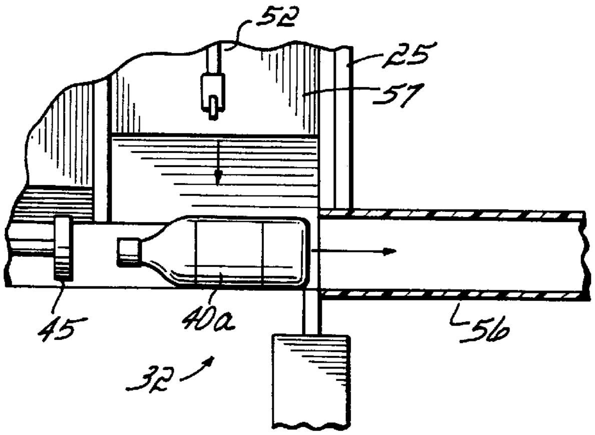
FIGS. 4A is a sectional view of a portion of FIG. 2 illustrating the loading of a beverage in its packaging container into a pneumatic tube so that the packaging container forms the carrier.

The system of the present invention can also be used without a separate carrier 31, but rather with the packaging container such as the beverage container 40 serving the function of the carrier 31. This is practical with blow molded plastic beverage bottles and other reasonably shatter resistant containers, as for example, container 40*a,* as illustrated in FIG. 4A, which shows the container 40*a* being loaded directly into the tube 26 at the loading end 32 of the pneumatic system 30 by actuation of the plunger 45. With such direct loading of the container 40*a* into the tube 26, the internal cross-section of the tube 25 must match the external cross section of the container 40*a.* Preferably, the tube 26 is configured to accept standard packaging containers, which, in a bottled beverage vending system, is usually the round cross-section of a beverage bottle.

Figure 4B:
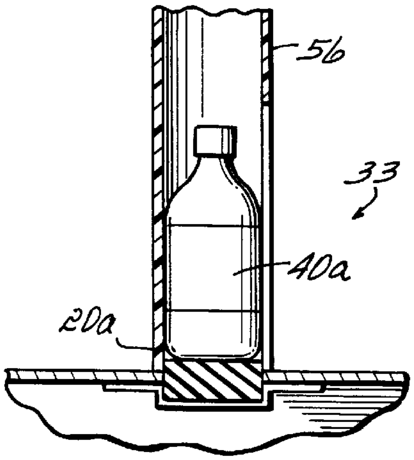
FIGS. 4B is a sectional view of a portion of FIG. 2 illustrating the delivery of the beverage of FIG. 4A in its container.

FIG. 4B illustrates beverage container 40*a* at a dispensing unit 20*a* at the discharge end 33 of the pneumatic system 30.

Such a pneumatic system may include the air cushion decelerating feature as described above or some other structure to slow the container 40*a* upon its arrival at the dispensing unit 20*a*.

Figure 4C:
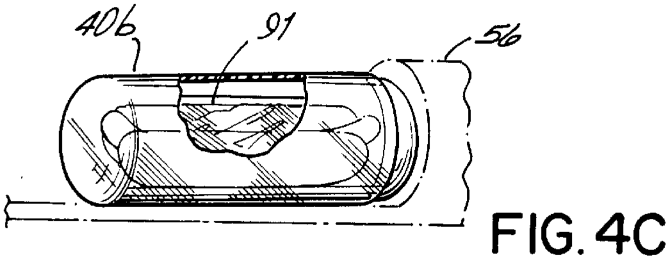
FIG. 4C is an isometric view of a food item in its packaging container for delivery through the pneumatic tube of the system of FIG. 1.

FIG. 4C illustrates a food packaging container 40*b*, such as a plastic tubular can with a wide lid at one end, that is of the same exterior cross section as the plastic beverage container 40*a* of FIGS. 4A and 4B. In the container 40*b* may be provided a sandwich 91, which may be delivered heated when selected by a customer. In such system, some sort of heating unit (not shown) such as a warmer that stores the product in heated condition, or microwave unit that heats the product in response to an order. Or the sandwich may be a cold sandwich that is stored under refrigeration. The food product is dispensed and then loaded in its warmed or refrigerated condition into the tube 26 in the same manner as a beverage is loaded, as described above. Similarly, a frozen product such as ice cream or some other food product may be similarly provided. Such product may be placed in the container 40*b* in a plastic film or paper wrapping or with such other packaging material as is necessary to insure its safe delivery through the tube 26. Such food items are preferably maintained in a prepackaged condition in such container 40*b* in the storage unit 25.

Figure 5A:
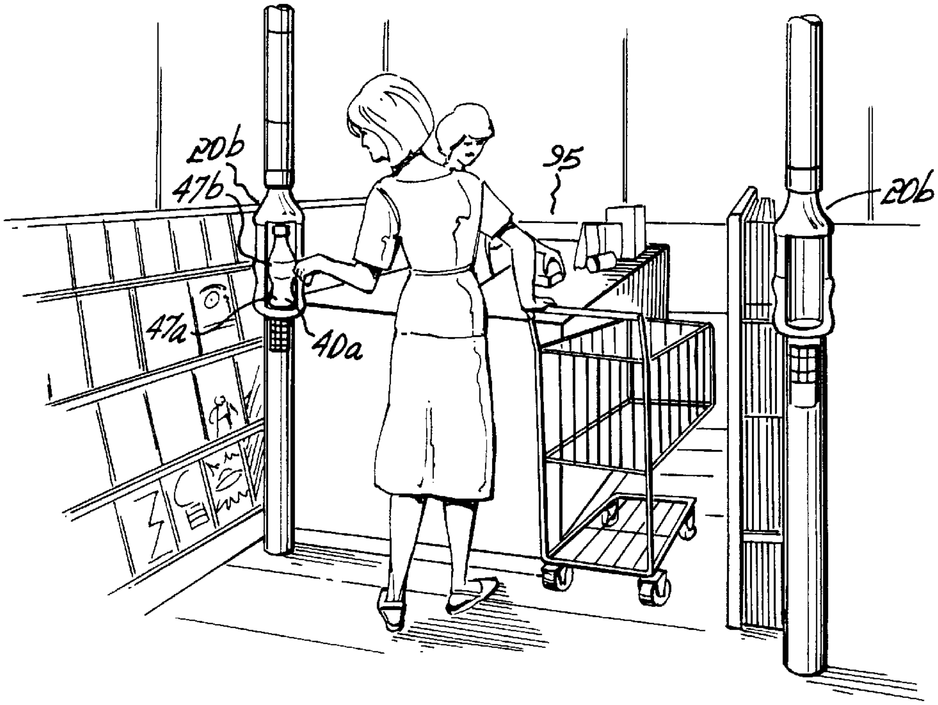
FIG. 5A is a perspective view of an alternative embodiment of the system of FIG. 1.

While the system 10 is disclosed in a gasoline station setting, it should be appreciated that such a system can be used in combination with other vending systems. Some features of the invention can be realized in a stand-alone system for dispensing food or beverages sold independently of other products. For example, in FIG. 5A a system 10*a* is illustrated in which the pneumatic system 30 thereof has its dispensing unit 20*b* at the checkout lane of a super market. Such a system 10*a* may charge the purchase of an purchased item, such as a beverage carried in a container 40*a*, to a grocery order being accounted for at a check-out counter 95.

Figure 5B:
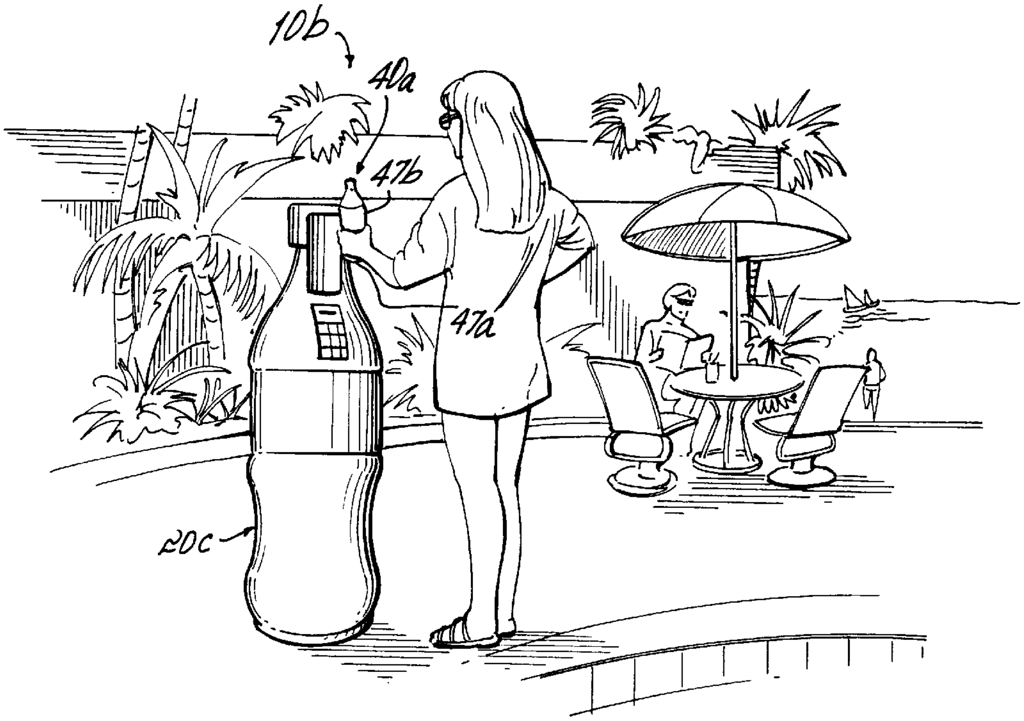
FIG. 5B is a perspective view of another alternative embodiment of the system of FIG. 1.

A further example is illustrated in FIG. 5B in which a dispensing unit 20*c* is provided in a system 10*b* at a recreational location such as a swimming pool or swimming club. Such a unit may contain its own charge card reader or, where at a membership facility or the like, accept a member code and charge the item to the member's account.

Figure 5C:
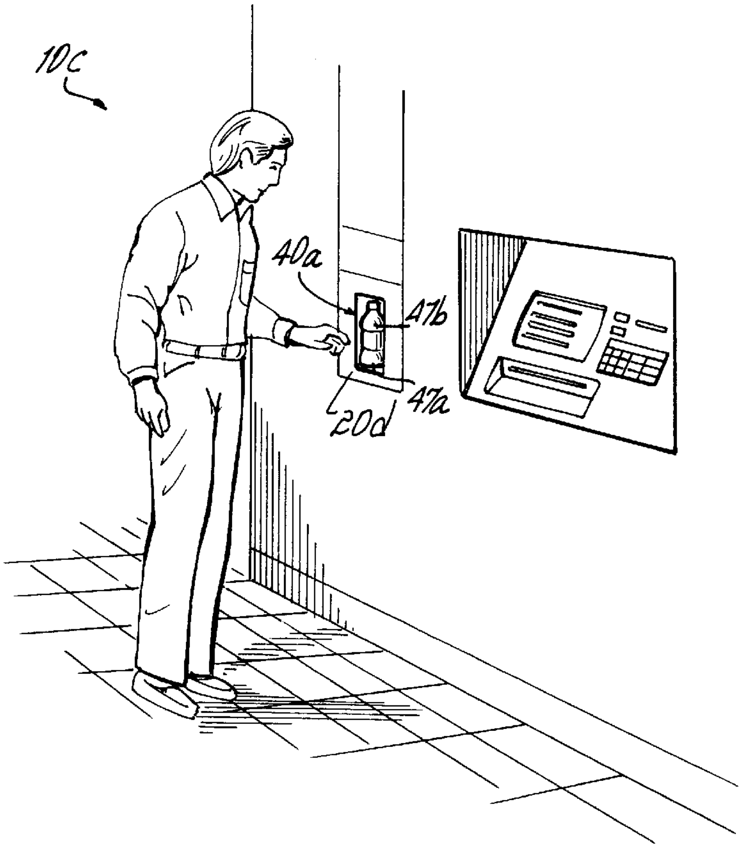
FIG. 5C is a perspective view of another alternative embodiment of the system of FIG. 1.

Further, FIG. 5C illustrates an example of a dispensing unit 20*d* of a system 10*c* that may be preferably associated with a device such as an automated teller machine or other accounting system at which an account of a customer is identified to facilitate a purchase.

Figure 5D:
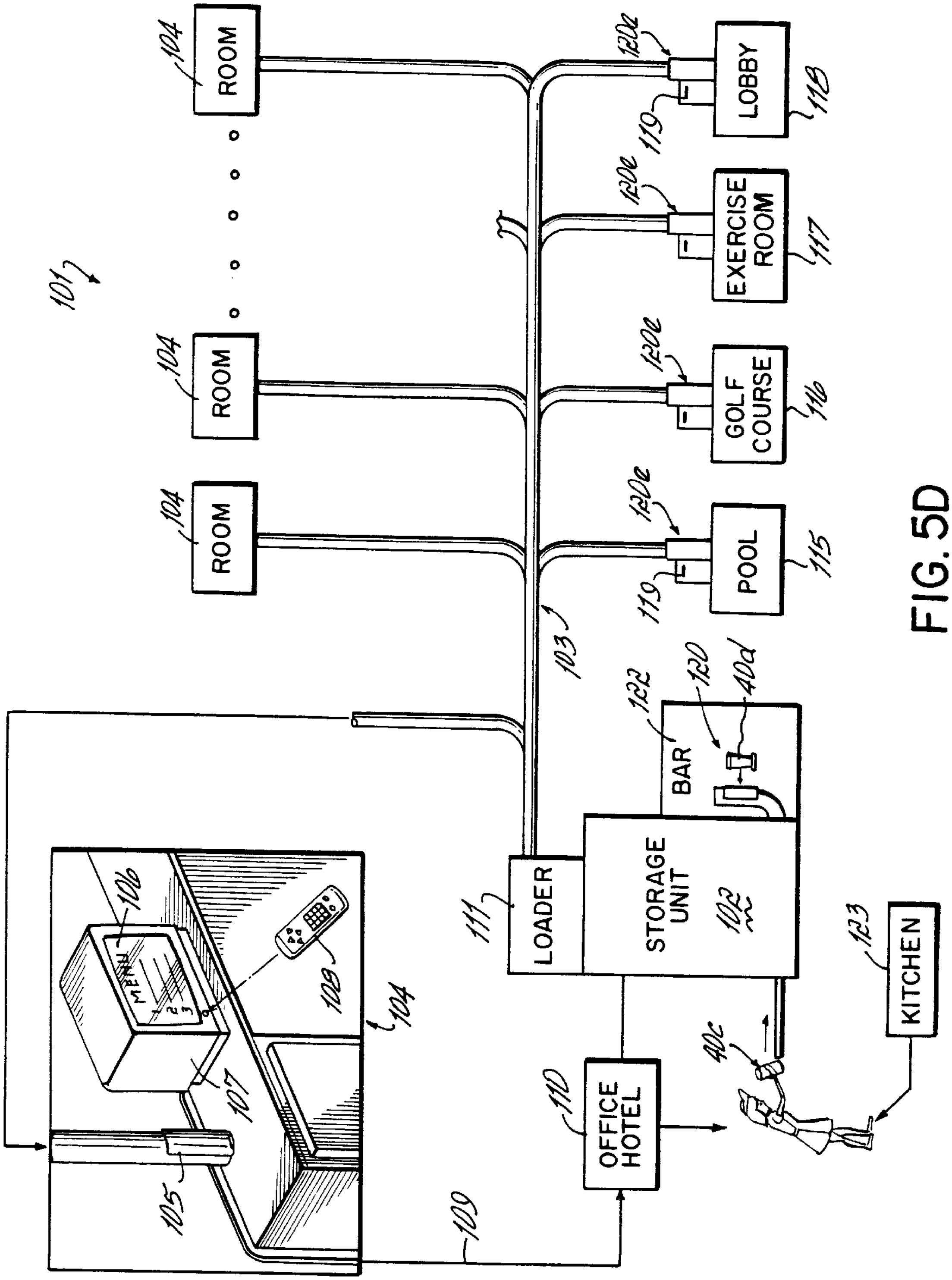
FIG. 5D is a diagrammatic illustration of an alternative embodiment of a system according to the present invention.

FIG. 5D illustrates a system 101 employing principles of the invention in a hotel for replacing a hotel room minibar system or other room supply or delivery system. In such a system 101 includes a pneumatic delivery system delivers food and beverages, towels or personal items to the guests' rooms in response to commands entered by the hotel guest on a data entry device, such as by use of a television set remote controller to select items from a menu displayed on a television screen in the guest's room. Such a system 101 includes a remote storage unit 102, similar to those described in the systems above, selectively connected through a pneumatic delivery system 103 with each of a plurality of guest rooms 104. In the rooms 104 is situated a delivery terminal 105 to which the container carrying the beverage or other product or item is presented to the room guest. The room guest selects the item desired from a menu displayed on the screen 106 of the cable television set 107 in the guest room 104, preferably by entering a menu item code on the channel selector of the television remote controller 108. The command signals are communicated through the television cable connection 109 to hotel office 110 and billing equipment located thereat, which includes circuits programmed to operate automated product selection and loading equipment 111 at the storage unit.

In the hotel system 101, the order commands originating from the guest rooms 104 are identified with the rooms 104 from which the commands originated, and therefore the products ordered may be automatically charged to the guest's room or account. When the guest is out of the room 104 and in another part of the hotel, such as at the swimming pool 115, on a golf course or tennis court or other recreational facility 116 of a resort hotel, in an exercise room 117, or in the hotel lobby, a hall or conference area 118, use of the system to order beverages or other products may result in a charge to the guest's room by the provision of a code entry device such as a key card reader 119, at dispensing terminals 20*e*, which condition the operation of the system on the entry of a personal identity number or insertion of a machine readable room key card to identify the guest and the guest room account to which the item is to be charged.

In such a hotel system 101, the storage unit may also be provided with a loading port 112 for accepting special food containers 40*c* manually loaded with food items comparable to room service items prepared by the hotel kitchen 113 in response to the orders entered by the guest in the rooms 104. The system 101 may be similarly provided with a loading port 120 for accepting custom mixed drinks in fillable beverage containers 40*d* at the hotel bar area 122.

Those skilled in the art will appreciate that there are many uses of the present invention and that the invention is described herein only in preferred embodiments. Accordingly, additions and modifications can be made without departing from the principles of the invention. Therefore, the following is claimed:

I claim:

1. An auxiliary system for vending individually packaged products to customers of a diverse product or service providing system having a payment receiving or charging subsystem associated therewith, wherein:

the diverse vending system includes an accounting subsystem to automatically charge purchases to an account of a customer:

the auxiliary system comprising:

an order entry device at a vending location accessible to a customer of the diverse system;

a product delivery unit at the vending location;

a product supply at a supply location having a plurality of products thereat;

a pneumatic conveyor responsive to a control signal from the controller, the conveyor including a delivery tube extending from the product supply to the product delivery unit, the tube having a loading end at the product supply and a delivery end connected to the product delivery unit;

a communication link logically interconnecting the auxiliary system with the payment subsystem of the diverse system; and control logic configured to generate the control signal and to cause the communication of transaction price information to the payment subsystem in response to the entry of an order on the order entry device to automatically charge a purchase of the vended product to the charge account of the customer.

2. The system of claim 1 wherein:

the product supply includes a product storage unit having a temperature maintained interior; and the product delivery unit is located in an ambient temperature environment.

3. The system of claim 1 wherein:

the pneumatic conveyor includes a hollow carrier moveable therein and adapted to enclose the product therein for transfer from the product supply terminal to the product delivery unit.

4. The system of claim 3 wherein:

the hollow carrier is a reusable hollow carrier.

5. The system of claim 3 wherein:

the order entry device includes a product selector operative to generate a product selection command in response to a product selection act by the customer at the vending location.

6. The system of claim 5 wherein:

the pneumatic conveyor includes a hollow carrier moveable therein and adapted to enclose the product therein for transfer from the product supply terminal to the product delivery unit.

7. The system of claim 1 wherein:

the pneumatic conveyor is configured to receive a packaged product in its packaging container at the supply terminal; and the pneumatic conveyor is operative, when activated, to apply a pneumatic pressure across the packaging container of the product to move the container and packaged product from the product supply to the product delivery unit.

8. An auxiliary system for vending individually packaged products to customers of a diverse product or service vending system having a payment receiving or charging subsystem associated therewith, the auxiliary system comprising:

an order entry device at a vending location accessible to a customer of the diverse system;

a product delivery unit at the vending location;

a product supply at a supply location having a plurality of products thereat;

a pneumatic conveyor responsive to a control signal from the controller, the conveyor including a delivery tube extending from the product supply to the product delivery unit, the tube having a loading end at the product supply and a delivery end connected to the product delivery unit;

a communication link logically interconnecting the auxiliary system with the payment subsystem of the diverse system;

control logic configured to generate the control signal and to cause the communication of transaction price information to the payment subsystem in response to the entry of an order on the order entry device; and wherein;

the diverse vending system is a gasoline vending system at a gasoline service facility having a gasoline service island which includes a gasoline pump and a credit card reader, and the payment subsystem thereof is a credit card billing subsystem connected to the pump and to a the credit card reader to automatically charge gasoline purchases to a charge account of the customer;

the order entry device and the product delivery unit are located at a gasoline service island; and the communications link logically interconnects the auxiliary system with the billing subsystem of the gasoline vending system to automatically charge a purchase of the vended product to the charge account of the customer.

9. An auxiliary system for vending individually packaged products to customers of a diverse product or service vending system having a payment receiving or charging subsystem associated therewith, the auxiliary system comprising:

an order entry device at a vending location accessible to a customer of the diverse system;

a product delivery unit at the vending location;

a product supply at a supply location having a plurality of products thereat;

a pneumatic conveyor responsive to a control signal from the controller, the conveyor including a delivery tube extending from the product supply to the product delivery unit, the tube having a loading end at the product supply and a delivery end connected to the product delivery unit;

a communication link logically interconnecting the auxiliary system with the payment subsystem of the diverse system;

control logic configured to generate the control signal and to cause the communication of transaction price information to the payment subsystem in response to the entry of an order on the order entry device; and wherein;

the diverse vending system is a product retail facility having a check-out lane thereat, the payment subsystem thereof including a cash register located at the check-out lane for receiving payment or charge identifying from the customer for products vended through the diverse vending system;

the order entry device and the product delivery unit are located at the check-out lane; and the communications link logically interconnects the auxiliary system with the cash register to automatically include the price of a purchase of the product vended by the auxiliary system to a total at the cash register.

10. An auxiliary system for vending individually packaged products to customers of a diverse product or service vending system having a payment receiving or charging subsystem associated therewith, the auxiliary system comprising:

an order entry device at a vending location accessible to a customer of the diverse system;

a product delivery unit at the vending location;

a product supply at a supply location having a plurality of products thereat;

a pneumatic conveyor responsive to a control signal from the controller, the conveyor including a delivery tube extending from the product supply to the product delivery unit, the tube having a loading end at the product supply and a delivery end connected to the product delivery unit;

a communication link logically interconnecting the auxiliary system with the payment subsystem of the diverse system;

control logic configured to generate the control signal and to cause the communication of transaction price information to the payment subsystem in response to the entry of an order on the order entry device; and wherein;

the diverse vending system is a membership facility of which the customer is a member and the payment subsystem includes a system for charging a membership account of the customer;

the order entry device and the product delivery unit are located at the membership facility; and the communications link logically interconnects the auxiliary system with the payment subsystem and includes means for receiving data identifying the member and automatically charging the purchase of a product vended through the auxiliary system to the membership account of the customer.

11. An auxiliary system for vending individually packaged products to customers of a diverse product or service vending system having a payment receiving or charging subsystem associated therewith, the auxiliary system comprising:

an order entry device at a vending location accessible to a customer of the diverse system;

a product delivery unit at the vending location;

a product supply at a supply location having a plurality of products thereat;

a pneumatic conveyor responsive to a control signal from the controller, the conveyor including a delivery tube extending from the product supply to the product delivery unit, the tube having a loading end at the product supply and a delivery end connected to the product delivery unit;

a communication link logically interconnecting the auxiliary system with the payment subsystem of the diverse system; and control logic configured to generate the control signal and to cause the communication of transaction price information to the payment subsystem in response to the entry of an order on the order entry device; and wherein the diverse vending system is a guest facility of which the customer is a guest registered to a room, the payment subsystem thereof including the room account of the customer;

the order entry device and the product delivery unit are located in the room of the customer; and the communications link logically interconnects the auxiliary system with the payment subsystem and includes means for identifying the room of the customer to automatically charge the purchase of the vended product to the room account of the customer.

12. An auxiliary system for vending individually packaged products to customers of a diverse product or service vending system having a payment receiving or charging subsystem associated therewith, the auxiliary system comprising:

an order entry device at a vending location accessible to a customer of the diverse system;

a product delivery unit at the vending location;

a product supply at a supply location having a plurality of products thereat;

a pneumatic conveyor responsive to a control signal from the controller, the conveyor including a delivery tube extending from the product supply to the product delivery unit, the tube having a loading end at the product supply and a delivery end connected to the product delivery unit;

a communication link logically interconnecting the auxiliary system with the payment subsystem of the diverse system;

control logic configured to generate the control signal and to cause the communication of transaction price information to the payment subsystem in response to the entry of an order on the order entry device; and wherein the diverse vending system is a guest facility of which the customer is a guest registered to a room, the payment subsystem thereof including the room account of the customer;

the order entry device and the product delivery unit are located in common space at the guest facility; and the communications link logically interconnects the auxiliary system with the payment subsystem and includes means for identifying the room of the customer to automatically charge the purchase of the vended product to the room account of the customer.

13. An auxiliary system for vending individually packaged products to customers of a diverse product or service vending system having a payment receiving or charging subsystem associated therewith, the auxiliary system comprising:

an order entry device at a vending location accessible to a customer of the diverse system;

a product delivery unit at the vending location;

a product supply at a supply location having a plurality of products thereat;

a pneumatic conveyor responsive to a control signal from the controller, the conveyor including a delivery tube extending from the product supply to the product delivery unit, the tube having a loading end at the product supply and a delivery end connected to the product delivery unit;

a communication link logically interconnecting the auxiliary system with the payment subsystem of the diverse system; and control logic configured to generate the control signal and to cause the communication of transaction price information to the payment subsystem in response to the entry of an order on the order entry device; and an automatic packaged product loading device connected to the loading end of the tube and responsive to the control signal to load a product into the tube.

14. An auxiliary system for vending individually packaged products to customers of a diverse product or service vending system having a payment receiving or charging subsystem associated therewith, the auxiliary system comprising:

an order entry device at a vending location accessible to a customer of the diverse system;

a product delivery unit at the vending location;

a product supply at a supply location having a plurality of products thereat;

a pneumatic conveyor responsive to a control signal from the controller, the conveyor including a delivery tube extending from the product supply to the product delivery unit, the tube having a loading end at the product supply and a delivery end connected to the product delivery unit;

a communication link logically interconnecting the auxiliary system with the payment subsystem of the diverse system;

control logic configured to generate the control signal and to cause the communication of transaction price information to the payment subsystem in response to the entry of an order on the order entry device; and wherein:

the product delivery unit is located sufficiently remote from the product supply to permit at least one pedestrian or vehicular access lane or a space dividing partition therebetween.

15. A method of vending packaged products comprising the steps of:

providing a product loading station;

providing a customer terminal remotely located from the loading station across an intermediate space sufficient to contain a pedestrian or vehicle access lane, a diverse article support or conveyor or a space divider, partition or thermal barrier, separating the loading station from the customer terminal, the terminal having thereat an order entry device and a product delivery unit;

providing a pneumatic conveyor having a tube extending from a loading station past the intermediate space to the product delivery unit of the customer terminal; then loading into a tube at the loading station, in response to an order entered through the order entry device by a customer, a product packaged in a packaging container; then moving the product with pneumatic pressure through the tube from the loading station to the customer terminal.

16. The method of claim 15 wherein:

the customer terminal providing step includes the step of providing the customer terminal in an ambient temperature environment; and the loading step includes the steps of:

maintaining the product at a non-ambient temperature, and loading the temperature maintained product into the tube.

17. The method of claim 15 wherein:

the differential pressure providing step includes the step of applying differential pressure directly across the packaging container of the product and thereby moving the product without a carrier in its packaging container to the product delivery unit.

18. The method of claim 15 further comprising the steps of:

providing the order entry device with a product selector on which a selection of one of a plurality of products can be selected by a customer; and the loading step including the step of, in response to a product selection made by the customer with the product selector, loading into the tube at the loading station a selected packaged product in accordance with the product selection.

19. The method of claim 15 further comprising the steps of:

providing payment means for, upon the actuation thereof, charging the price of the product to the customer; and actuating the payment means, in response to the entry of an order through the order device.

20. The method of claim 19 wherein:

the payment means providing step includes the step of connecting the payment means in communication with a payment subsystem of a diverse product or service vending system; and the method further comprising the step of processing the charging of the price of the product through the payment subsystem of the diverse system.

21. The method of claim 20 wherein the diverse vending system includes a lodging facility for vending guest room accommodations to guests and having a payment subsystem by which room accommodation charges are posted to guest room accounts of the guests, and wherein:

the product loading station is provided at a central location in the lodging facility;

one such customer terminal is provided in each of a plurality of the guest rooms of the facility;

the pneumatic conveyor is provided with at least a portion of the tube extending from the loading station to the product delivery unit of each of the customer terminals;

the payment means is provided with a communication link connecting the order entry device of each customer terminal with the payment subsystem of the lodging facility; and the loading, moving and actuating steps include the steps of processing an order entered on the order entry device in guest room of a guest of the facility, pneumatically delivering an ordered product through the tube to the delivery unit in the guest room of the guest and charging the price of the delivered product to a guest room account of the guest.

22. The method of claim 20 wherein the diverse vending system includes a lodging facility for vending guest room accommodations to guests and having a payment subsystem by which room accommodation charges are posted to guest room accounts of the guests, and wherein:

the product loading station is provided at a central location in the lodging facility;

the customer terminal is provided in a location accessible to guests of the facility;

the payment means is provided with a communication link connecting the order entry device of the customer terminal with the payment subsystem of the lodging facility and includes means for identifying a guest room account of a guest of the facility who is entering an order on the order entry device; and the loading, moving and actuating steps include the steps of processing an order entered by a guest on the order entry device at the customer terminal, pneumatically delivering an ordered product through the tube to the delivery unit at the customer terminal and charging the price of the delivered product to a guest room account of the guest entering the order.

23. The method of claim 20 wherein the diverse vending system includes a membership facility for vending membership privileges to members of the facility and having a payment subsystem by which membership charges are posted to membership accounts of the members, and wherein:

the product loading station is provided at a central location in the membership facility;

the customer terminal is provided in a location accessible to members of the facility;

the payment means is provided with a communication link connecting the order entry device of the customer terminal with the payment subsystem of the membership facility and includes means for identifying a membership account of a member of the facility who is entering an order on the order entry device; and the loading, moving and actuating steps include the steps of processing an order entered by a member on the order entry device at the customer terminal, pneumatically delivering an ordered product through the tube to the delivery unit at the customer terminal and charging the price of the delivered product to a membership account of the member entering the order.

24. The method of claim 20 wherein the diverse vending system includes a retail facility for vending goods or services to customers of the facility and having a payment subsystem by which charges are posted to customer accounts of its customers, and wherein:

the product loading station is provided at a central location in the retail facility;

the customer terminal is provided in a location accessible to customers of the facility;

the payment means is provided with a communication link connecting the order entry device of the customer terminal with the payment subsystem of the retail facility and includes means for identifying a customer account of a customer of the facility; and the loading, moving and actuating steps include the steps of processing an order entered by a customer on the order entry device at the customer terminal, pneumatically delivering an ordered product through the tube to the delivery unit at the customer terminal and charging the price of the delivered product to a customer account of the customer entering the order.

25. The method of claim 20 wherein the diverse vending system includes a retail facility for vending goods or services to customers of the facility and having a billing subsystem by which charges for the goods or services purchased in a purchasing transaction by a customer of the facility are posted to customer accounts of the customer, and wherein:

the product loading station is provided at a central location in the retail facility;

the customer terminal is provided in a location occupied by a customer of the facility who is engaged in a goods or services purchasing transaction with the facility;

the payment means is provided with a communication link connecting the order entry device of the customer terminal with the payment subsystem of the retail facility and includes means for charging a customer account of the customer engaged in the purchasing transaction; and the loading, moving and actuating steps include the steps of processing an order entered by a customer on the order entry device at the customer terminal, pneumatically delivering an ordered product through the tube to the delivery unit at the customer terminal and charging the price of the delivered product to the customer account of the customer engaged in the purchasing transaction.

26. The method of claim 25 wherein the retail facility includes a gasoline service station having a central building and at least one gasoline pump service island spaced across a vehicle access lane for the building, the payment subsystem including a credit card reader at the service island in communication with the payment subsystem by which charges for gasoline purchases by a customer of the gasoline service station are posted to charge accounts of gasoline customers, and wherein:

the product loading station is provided at the central building;

the customer terminal is provided at the gasoline pump service island; and the loading, moving and actuating steps include the step charging the price of the delivered product to the account of a gasoline customer engaged in a gasoline purchasing transaction.

27. The method of claim 25 wherein the payment subsystem of the retail facility includes a checkout counter having a payment register located thereat for processing charges for the goods or services purchased by a customer of the facility in the purchasing transaction, and wherein:

the customer terminal is provided adjacent an area occupied by a customer whose purchasing transaction is being processed at the register; and the loading, moving and actuating steps include the step charging the price of the delivered product to the transaction of the customer being processed at the register.

28. The method of claim 19 wherein:

the customer terminal is provided adjacent a vehicle access lane;

the loading station is in a structure occupied by a food preparation operation;

the loading step includes the steps of preparing food products in the structure and, in response to the order entered through the order entry device, packaging the prepared food in a packaging container, inserting the packaged food into the tube and pneumatically moving the packaged food in its container to the product delivery unit.

29. The method of claim 19 further comprising the steps of:

in response to the order entered through the order entry device, mixing a beverage in the vicinity of the loading station, packaging the mixed beverage in a packaging container, inserting the packaged beverage into the tube and pneumatically moving the packaged beverage in its container to the product delivery unit.

30. A system for vending packaged products comprising:

a product loading station;

terminal means for receiving order commands from a customer and presenting products to a customer thereat, the remote terminal means including a product delivery unit;

the product supply terminal being physically separated from the remote terminal by an intervening building structure or partition or an otherwise useful space that is part of neither the loading station or the supply terminal;

a pneumatic conveyor having a tube extending from a loading station to the product delivery unit of the remote terminal means;

means for actuating the conveyor in response to an order entered through the order entry device by a customer to move a packaged product packaged to the product delivery unit remote terminal means; and the pneumatic conveyor extending from the loading station across the structure or space, between the two locations, to the dispensing unit.

31. The system of claim 30 wherein:

the actuating means includes means for applying differential pressure directly across the packaging container of the product and thereby moving the product without a carrier in its packaging container to the product delivery unit.

32. The system of claim 30 wherein:

the remote terminal means includes means for selecting one of a plurality of products; and the system further includes means at the loading station responsive to the selecting means for loading a selected packaged product into the tube.

33. The system of claim 30 further comprising:

payment means for processing the charging of the price of the product to the customer.

34. The system of claim 33 wherein:

the payment means includes means for communicating with a payment subsystem of a diverse product or service vending system for processing the charging of the price of the product.

35. A system for vending packaged products comprising:

a product loading station;

remote terminal means for receiving order commands from a customer and presenting products to a customer thereat;

a pneumatic conveyor having a tube extending from a loading station to the product delivery unit of the remote terminal;

means for actuating the conveyor in response to an order entered through the order entry device by a customer to move a packaged product packaged to the product delivery unit;

restockable supply means at the loading station; and means at the loading station responsive to the quantity of products in the supply means for generating an restocking signal to a supplier.

* * * * *